United States Patent [19]

Hetzler et al.

[11] 4,009,699

[45] Mar. 1, 1977

[54] DIGITAL IGNITION SPARK TIMING ANGLE CONTROL WITH READ ONLY MEMORY

[75] Inventors: Lewis R. Hetzler; Gerald O. Huntzinger; William P. Winstead, III; Thomas A. Zickel, all of Anderson, Ind.

[73] Assignee: General Motors Corporation, Detroit, Mich.

[22] Filed: Jan. 19, 1976

[21] Appl. No.: 650,164

[52] U.S. Cl. .................. 123/117 D; 123/32 EB; 123/146.5 A

[51] Int. Cl.² .......................................... F02P 1/00

[58] Field of Search .... 123/117 D, 117 R, 146.5 A, 123/32 EB, 32 EC

[56] References Cited

UNITED STATES PATENTS

| 3,483,364 | 12/1969 | Leeson | 123/32 EB |
| 3,738,339 | 6/1973 | Huntzinger et al. | 123/146.5 A |
| 3,749,073 | 7/1973 | Asplund | 123/148 E |
| 3,835,819 | 9/1974 | Anderson | 123/117 D |
| 3,903,857 | 9/1975 | Honig et al. | 123/117 R |
| 3,927,648 | 12/1975 | Kawai et al. | 123/117 D |
| 3,942,491 | 3/1976 | Seite et al. | 123/117 D |

Primary Examiner—C. J. Husar
Assistant Examiner—Paul Devinsky
Attorney, Agent, or Firm—Richard G. Stahr

[57] ABSTRACT

A read only memory is pre-programmed to produce an output binary signal representation of a predetermined ignition spark timing angle based upon the instantaneous value of both of two selected engine operating parameters at each of a plurality of respective selected points within the range of values in response to respective input address signals. Over the range of values of the two selected engine operating parameters, therefore, the read only memory generates a three-dimensional surface of ignition spark timing angles. The binary signal representations of the ignition spark timing angles retrieved from the read only memory are varied in accordance with engine manifold vacuum and actual atmospheric pressure to tilt the three-dimensional surface generated by the read only memory about a selected engine parameter value as an axis in an amount substantially inversely proportional to actual atmospheric pressure.

5 Claims, 5 Drawing Figures

DIGITAL IGNITION SPARK TIMING ANGLE CONTROL WITH READ ONLY MEMORY

This invention relates to ignition spark timing controls for spark ignition internal combustion engines and, more specifically, to an ignition spark timing control which is responsive to respective input binary singal representations of the values of selected independently variable engine operating parameters for producing output binary signal representations of predetermined ignition spark timing angles based upon the instantaneous values of the selected engine operating parameters.

The advent of reliable and inexpensive read only memory units (ROMs) provides a practical way of controlling the timing of a spark ignition internal combustion engine in accordance with any two selected operating variables, such as engine speed and intake manifold vacuum. Such timing, by the use of a ROM, can be established in accordance with actual tested engine characteristics, and is not limited to any reproducible mathematical function of these variables. The control thus established can be viewed as being responsive to a three-dimensional surface wherein elevation in relation to a base plane is the spark advance in relation to a top dead center position, distance along one axis in the plane is representative of engine speed, and distance along an axis orthogonal thereto is representative of manifold vacuum. It has been found, however, that the control established in this fashion is permitted by the ROM capability may be advantageously modified to reflect the combined effect of atmospheric pressure and engine vacuum on spark timing. In other words, it is desirable to provide spark advance values that reflect a four-dimensional surface in which the spark advance value is determined by each of engine speed, engine manifold vacuum, and atmospheric pressure as independent operating variables. Viewed differently, the control may be visualized as a three-dimensional surface associated with the ROM in conjunction with engine speed and manifold vacuum as independent variables which is shifted variably within an envelope of values and about a selected manifold vacuum value as a reference and in accordance with the value of atmospheric pressure.

It is, therefore, an object of this invention to provide an improved spark ignition internal combustion engine ignition spark timing angle control system.

It is another object of this invention to provide an improved spark ignition internal combustion engine ignition spark timing angle control system utilizing a read only memory pre-programmed to produce output binary signal representations of ignition spark timing angles based upon engine speed and manifold vacuum variables wherein the timing angle binary signal representations are further varied by a combined function of engine manifold vacuum and atmospheric pressure.

A further and more specific object of this invention is to provide a spark ignition internal combustion engine ignition spark timing angle control system of the foregoing type in which the combined engine manifold vacuum and atmospheric pressure control function is generated in a simple and effective fashion lending itself to the processing characteristics of the read only memory with a minimum of additional circuit elements.

In accordance with this invention, an ignition spark internal combustion engine ignition spark timing angle control system is provided wherein a read only memory is pre-programmed to produce, in response to input address signals, output binary signal representations of predetermined ignition spark timing angles, based upon the instantaneous values of both engine speed and engine manifold vacuum, which are further varied in accordance with a combined function of engine manifold vacuum and atmospheric pressure.

For a better understanding of the present invention, together with additional objects, advantages and features thereof, reference is made to the following description and accompanying drawings in which:

FIG. 1 sets forth the novel ignition spark timing angle control circuit of this invention in block form;

Figure 1:
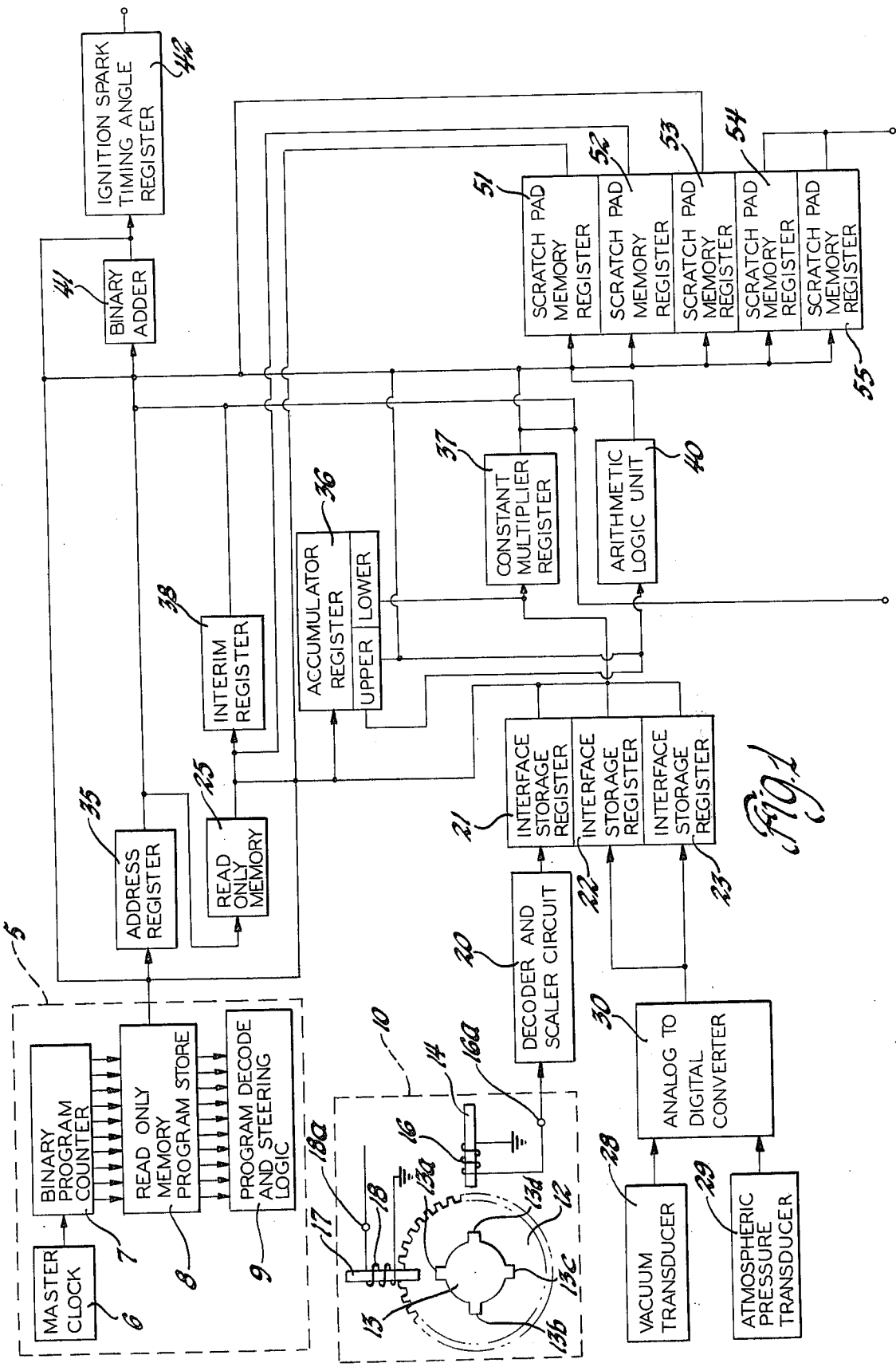

As the ignition spark timing angle control system of this invention is a combination of several logic circuit elements and modules well known in the digital computer art, in the interest of reducing drawing complexity, it is set forth in the drawing in block form.

Referring to FIG. 1 of the drawing, the sequence of operational steps in response to which the ignition spark timing angle control system of this invention produces output binary signal representations of predetermined ignition spark timing angle based upon the instantaneous values of selected engine operating parameters is established by a sequence control arrangement 5, hereinafter referred to as the "sequence control". The sequence control includes a master clock oscillator 6, a binary program counter 7, a read only memory 8 in which the program is stored and program decoder and steering logic 9 which decodes the program instruction code numbers and controls interconnects and routing paths. The binary program counter 7, which provides address words for the read only memory 8 in which the program is stored, is driven by and counts the master clock oscillator output signals in increments of one count per signal, each increment being referred to as a "state".

At each state, an instruction number is implemented from a stored program, not shown, which is decoded and properly directed by the program decoder and steering logic in a manner well known in the digital computer art. The master clock may be a crystal controlled oscillator of any selected design well known in the electronics art, the binary counter may be a commercially available binary counter of a design well known in the art, the program store may be a commercially available read only memory and the program decoder and steering logic may be made up of commercially available and well known logic gate circuits. Preferably, all of these circuit elements may be laid down on an integrated electronic circuit chip by techniques well known in the metal oxide semiconductor art. In a practical application of the ignition spark timing control circuit of this invention, a crystal controlled oscillator master clock drive a 10 stage binary digital program counter in increments of one count or state every 36 microseconds.

The preferred engine operating parameters upon which the predetermined ignition spark timing angles are based are engine speed and engine manifold vacuum. These predetermined ignition spark timing angles are further varied in response to engine manifold vacuum and atmospheric pressure in an amount substantially inversely proportional to atmospheric pressure. The predetermined ignition spark timing angle for each value of engine speed and vacuum and the amount of variation thereof for each combination of engine manifold vacuum and actual atmospheric pressure may be determined empirically, for example, or by any other convenient method.

Engine speed may be determined by properly processing a series of digital signal pulses of a repetition rate directly proportional to engine speed through several procedures well known in the art. Two preferred procedures for processing the variable frequency digital signals which are of a frequency directly proportional to engine speed to obtain engine speed will be briefly described. The variable frequency digital signals, such as from an alternator driven by the engine, may be gated to the input circuit of a conventional binary counter or register for a predetermined definite period of time. The binary output signal of the binary counter at the conclusion of each gate time interval is a binary code representation of the number of digital signal input pulses during the gate time interval, the higher the engine speed, the greater the number of digital signals counted during the gate time interval. Alernatively, the frequency of the digital signal pulses may be monitored by an electronic circuit sensitive to pulse frequency which produces an output signal determined by the number of pulses per second and is thus a representation of engine speed. In either process, the output signal representations of engine speed are converted by a decoder and scaler circuit 20 of conventional, well known, design into binary signal representation words compatible with the remainder of the circuit. The compatible engine speed binary signal representation words may be placed in interface storage register 21.

Referring to the drawing, a crankshaft position sensor and a reference pulse generator 10 are provided for producing a series of crankshaft position electrical pulses, each corresponding to one degree of rotation of the engine crankshaft, of a repetition rate directly proportional to engine speed and a reference electrical pulse at a predetermined number of degrees before the top dead center position of each engine piston, respectively. These items may comprise a circular disc member 12 of magnetic material having 360 teeth about the periphery, that is, a tooth for each degree. In the drawing, only a few representative teeth have been shown in the interest of reducing drawing complexity. Disc member 12 is preferably mounted upon and rotated by the engine crankshaft but may be mounted upon and rotated by any other engine or vehicle shaft which is rotated at a speed equal to engine crankshaft speed. Carried upon and rotated with disc member 12 is a pole piece 13 of magnetic material having a salient pole tip corresponding to each two engine cylinders. For an eight cylinder engine, therefore, pole piece 13 has four salient pole tips 13a, 13b, 13c and 13d, as shown in FIG. 1. A permanent magnet 14 having a crankshaft position sensor pickup coil 16 wound thereupon is located in magnetic coupling relationship with the teeth about the periphery of disc member 12 and another permanent magnet 17 having a reference pulse generator pickup coil 18 wound thereupon is located in magnetic coupling relationship with the salient pole tips 13a, 13b, 13c and 13d of pole piece 13. As disc member 12 and pole piece 13 are rotated at engine crankshaft speed, therefore, a series of crankshaft position electrical pulses, each corresponding to one degree of engine crankshaft rotation and of a repetition rate directly proportional to engine speed, are induced in pickup coil 6 and appear upon the output circuit which may be a terminal 16a and reference electrical pulses, hereinafter referred to as reference pulses, are induced in pickup coil 18 and appear upon the output circuit which may be a terminal 18a. Pole piece 13 is so oriented that, when each salient pole tip thereof is adjacent permanent magnet 17, the reference pulse is induced in pickup coil 18 a predetermined number of degrees before the top dead center position of the engine piston of the cylinder to which it corresponds. That is, the reference pulse generator produces a reference pulse at a selected number of degrees before the top dead center position of each engine piston. It is to be specifically understood that optical sensors or any other type sensor or any combination thereof may be substituted for the magnetic crankshaft position sensor and reference pulse generator without departing from the spirit of the invention.

Engine manifold vacuum and actual atmospheric pressure are sensed by conventional, commercially available vacuum and pressure transducers, respectively, of the type which produce a direct current output signal of a potential level magnitude directly proportional to manifold vacuum and actual atmospheric pressure, respectively. As these transducers per se form no part of this invention, they have been represented in FIG. 1 of the drawing in block form and referenced by the numerals 28 and 29, respectively. These analog signal representations of engine manifold vacuum and actual atmospheric pressure are converted and scaled by an analog to digital converter and scaler circuit 30, which may be of well known design, into engine manifold vacuum and atmospheric pressure binary signal representation words compatible with the remainder of the circuit. The compatible engine manifold vacuum and atmospheric pressure binary signal representation words may be placed in respective interface storage registers 22 and 23 until later required.

Figure 2:
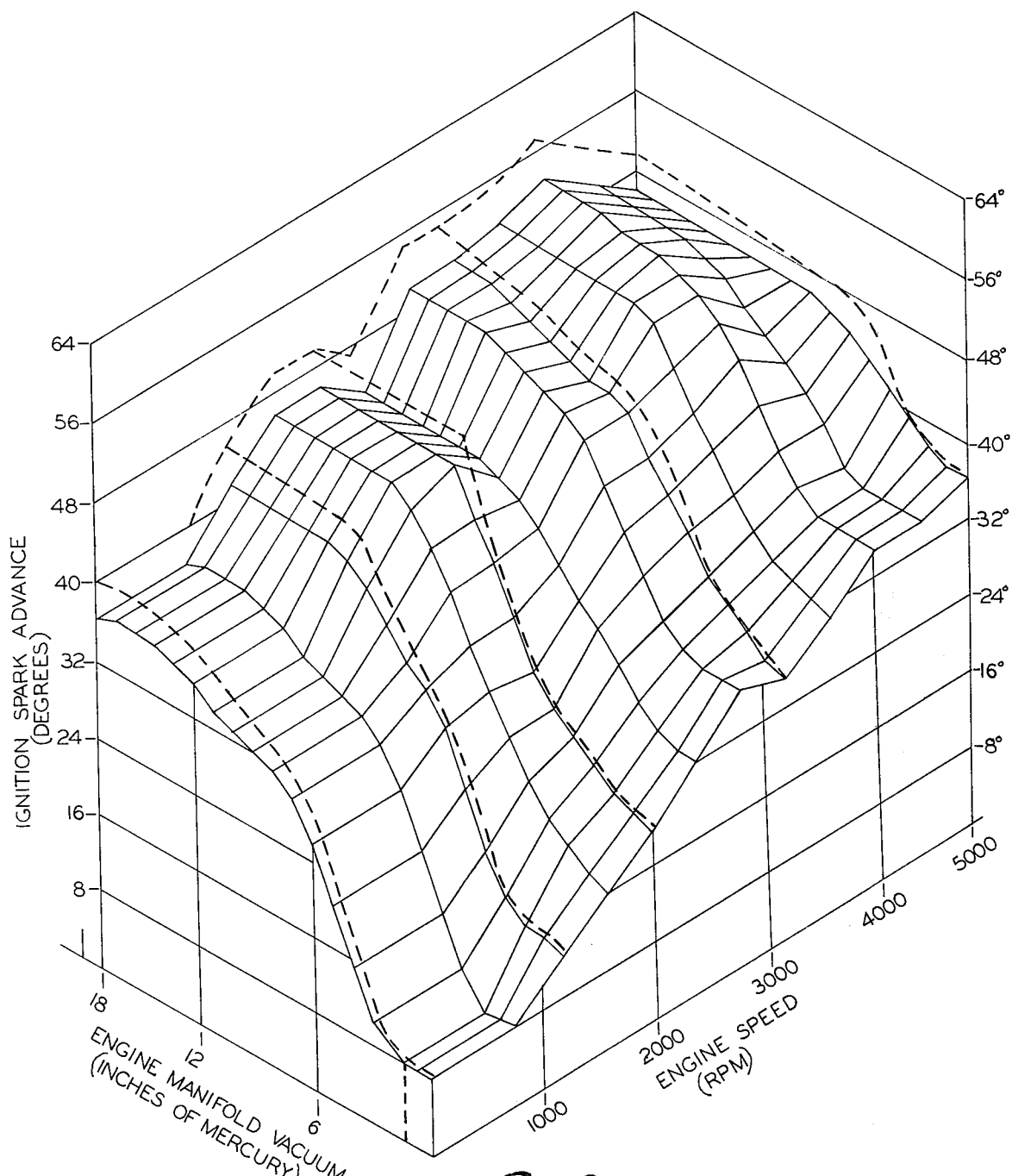
FIG. 2 is a representation of the loci of the predetermined ignition spark timing angles produced by the read only memory circuit element of FIG. 1.

A conventional, commercially available read only memory 25 is pre-programmed to produce an output binary signal representation of a predetermined ignition spark timing angle based upon the instantaneous value of both of two selected engine operating parameters, for purposes of this specification engine speed and manifold vacuum, at each of a plurality of respective selected points within the range of values in response to respective input address signals. Over the range of values of engine speed and manifold vacuum, therefore, read only memory 25 generates a three-dimensional surface of ignition spark timing angles based upon engine speed and manifold vacuum values as shown in FIG. 2. One example, and without intention or inference of a limitation thereto, of a read only memory suitable for use with the circuit of this invention is marketed by Intel Corporation of Santa Clara, Cal. under the designation, "Type 1702". For purposes of this specification and without intention or inference of a limitation thereto, the selected points within the range of values of engine speed and manifold vacuum at which read only memory 25 is pre-programmed to produce the output binary signal representations of the predetermined ignition spark timing angles are every 200 engine revolutions per minute between 600 and 2800 RPM and every 400 engine revolutions per minute above 2800 RPM and every 1.5 inches of mercury engine manifold vacuum between zero and 21.0 inches of mercury. Within the range of 600 to 4400 engine RPM and within the range of 0 to 21.0 inches of mercury engine manifold vacuum, therefore, there are 208 selected points, each a combination of a value of engine speed and a value of engine vacuum. That is, there are 208 addressable word locations, hereinafter referred to as "address locations", in read only memory 25, each of which, when addressed, will produce an output binary signal representation of a predetermined ignition spark timing angle based upon an instantaneous value of each engine speed and manifold vacuum.

Figure 3:
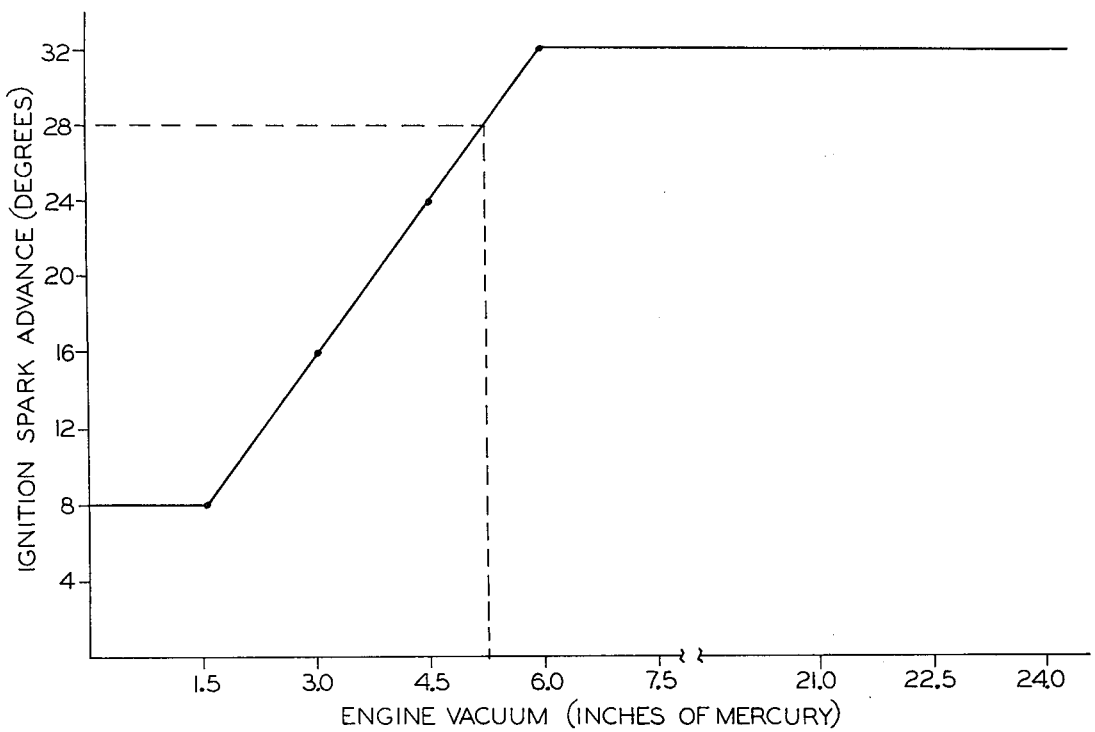
FIG. 3 is a typical ignition spark vacuum advance curve.

FIG. 3 of the drawing sets forth a typical ignition spark vacuum advance curve for a spark ignition internal combustion engine. The specific engine for which this curve was prepared requires 8° ignition spark vacuum advance between zero and 1.5 inches of mercury manifold vacuum, 16° ignition spark vacuum advance at 3.0 inches of mercury manifold vacuum, 24° ignition spark vacuum advance at 4.5 inches of mercury manifold vacuum and a maximum of 32° ignition spark vacuum advance for all values of manifold vacuum of 6.0 inches of mercury and greater. These points on the curve of FIG. 3 are stored in a read only memory as binary signal representations of the respective values in degrees of ignition spark vacuum advance. The read only memory in which these points are stored may be read only memory 25 or another similar read only memory.

Figure 4:
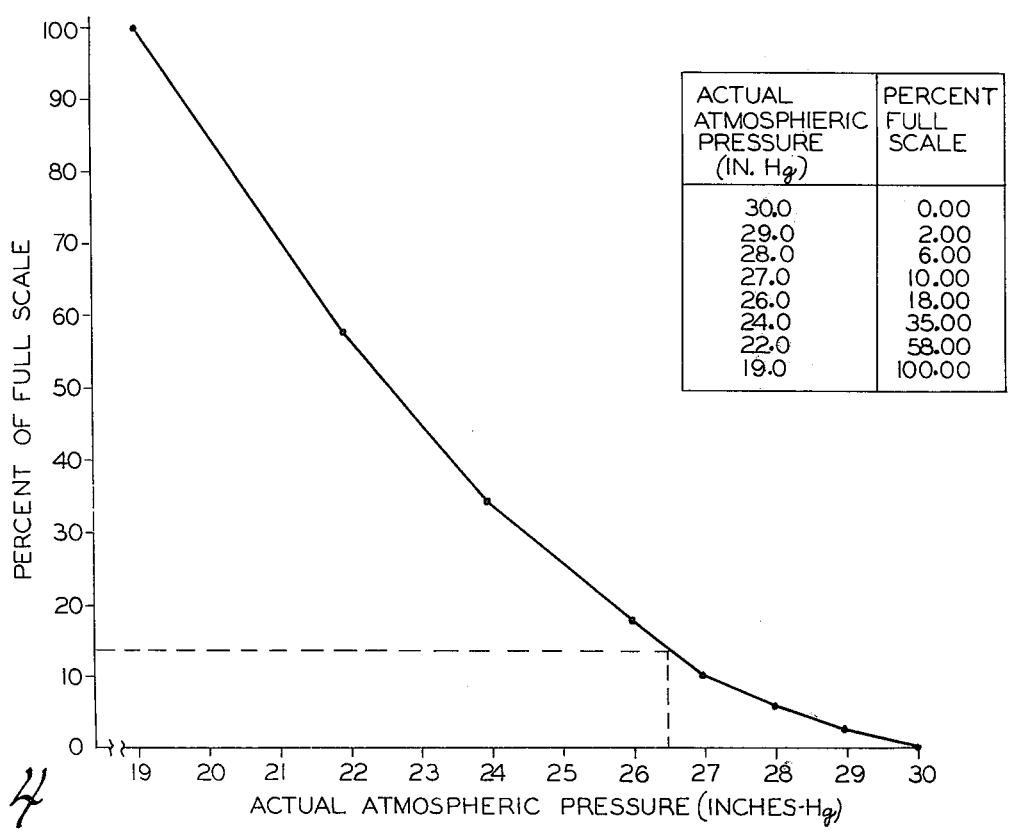
FIG. 4 is a curve useful in understanding this invention.

FIG. 4 of the drawing sets forth a curve which represents the percentage of full scale ignition spark vacuum advance of FIG. 3 by which the binary signal representations of the ignition spark timing angles retrieved from read only memory 25 are varied in accordance with engine manifold vacuum and actual atmospheric pressure in substantial inverse proportion to actual atmospheric pressure. At 30, 29, 28, 27, 26, 24, 22, and 19 inches of mercury atmospheric pressure, the binary signal representations of the ignition spark timing angles as retrieved from read only memory 25 are varied by respective amounts of 0, 2.0, 6.0, 10.0, 18.0, 35.0, 58.0, and 100 percent of the full scale ignition spark vacuum advance of FIG. 3. These points on the curve of FIG. 4 are stored in a read only memory as binary signal representations of the respective percentage values. The read only memory at which these points are stored may be read only memory 25 or another similar read only memory.

Figure 5:
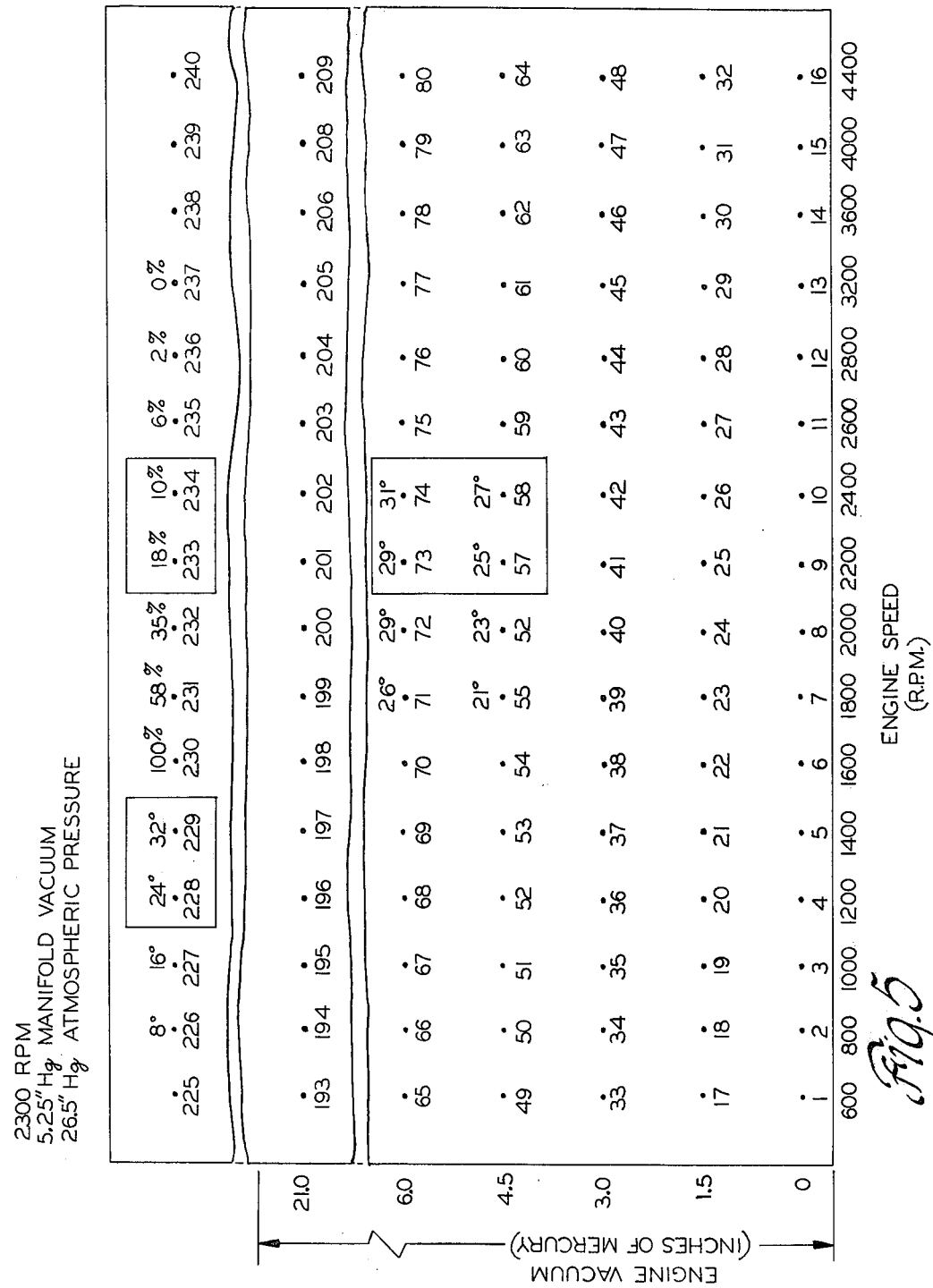
FIG. 5 is a representation of three areas of the read only memory pertinent to this specification.

FIG. 5 of the drawing is a schematic representation of the three fragments of read only memory 25 pertinent to this specification. In FIG. 5, each address location within read only memory 25 is represented as a dot, each of which is referenced by the decimal numeral corresponding to its address location code number. In a practical application of the ignition spark timing control system of this invention, each time an address location is read only memory 25 is addressed, read only memory 25 produces an output binary signal representation of an ignition spark timing angle in the form of a binary code word of 10 binary bits.

For purposes of this specification, it will be assumed that:

a. read only memory 25 is a 16 × 15 matrix of address locations;

b. the binary signal representations of the engine speed - engine manifold vacuum ignition spark timing angles are stored in address locations 1–208, inclusive, of read only memory 25 with the binary signal representation word for the ignition spark timing angle corresponding to 600 engine RPM at zero inches of mercury manifold vacuum being stored in address location 1;

c. the binary signal representations of the degrees ignition spark vacuum advance at the selected four points of the ignition spark vacuum advance curve of FIG. 3 are stored in address locations 226–229, inclusive, of read only memory 25;

d. the binary code representations of the percentage of full scale vacuum advance at the selected eight points of FIG. 4 are stored in address locations 230–237, inclusive, of read only memory 25; and e. the engine is operating under constant conditions of 2300 RPM at 5.25 inches of mercury manifold vacuum in an ambient atmospheric pressure of 26.5 inches of mercury.

A review of FIG. 5 indicates that the selected engine speed points correspond to respective columns and the selected engine manifold vacuum points correspond to respective rows of address locations in read only memory 25. Therefore, analog to digital converter and scaler 30 and decoder and scaler circuit 20 are designed to code, respectively, the engine manifold vacuum values and engine speed values as respective 10 bit binary signal representation words of two five bit sections, hereinafter referred to as the upper and lower sections, each of which is treated as a separate word. For purposes of this specification, the first bit position from the right for each section will be the least significant bit position corresponding to the decimal numeral one. The upper section of each engine manifold vacuum binary signal representation word designates the row of read only memory 25 address locations corresponding to the value of engine vacuum coded and the upper section of each engine speed binary signal representation word designates the column of read only memory 25 address locations corresponding to the value of the engine speed coded. The lower section of each engine manifold vacuum binary signal representation word and each engine speed address word designates the fraction of the difference between the values of any two selected points within the range of values of engine manifold vacuum or engine speed by which a coded value of engine manifold vacuum or engine speed which is between any two of the selected points exceeds the value of the next lowest point. For example, the difference between the values of any two selected points within the range of values of engine manifold vacuum is 1.5 inches of mercury. The fraction of the difference of 1.5 inches of mercury by which a value of 3.75 inches of mercury engine manifold vacuum, between selected points 3.0 inches and 4.5 inches of mercury engine manifold vacuum, exceeds the value of next lowest selected point of 3.0 inches of mercury engine manifold vacuum is 0.75/1.5 or ½. A five bit binary code can express 32 decimal numbers. Therefore, the fractions of the difference between the values of any two selected points are represented as that fraction of 32. For example, the fraction ⅛ is 4/32 and is coded 00100; the fraction ¼ is 8/32 and is coded 01000; the fraction ½ is 16/32 and is coded 10000, etc.

With the engine operating under substantially constant conditions of 2300 RPM at 5.25 inches of mercury manifold vacuum in an ambient atmospheric pressure of 26.5 inches of mercury, when an output binary signal representation of an ignition spark timing angle is to be calculated, sequence control 5 implements the necessary instructions to step the ignition spark timing angle control system of this invention through the necessary operations.

The binary word address signal for address location 1, binary word 00000–00001, of read only memory 25 is retrieved from read only memory program store 8 and loaded into address register 35 and the contents of interface memory register 22, which contains the binary signal representation word for 5.25 inches of mercury engine manifold vacuum, is scaled and loaded into accumulator register 36. The value of 5.25 inches of mercury engine manifold vacuum is between the values of respective selected points of engine manifold vacuum 4.5 inches and 6.0 inches of mercury, corresponding to the fourth and fifth rows of address locations of read only memory 25 as shown in FIG. 5, and exceeds the next lowest selected point by one-half the difference between the selected points. Therefore, the value of 5.25 inches of mercury engine manifold vacuum is coded by analog to digital converter and scaler 30 as the binary signal representation word 00100–10000, the upper section 00100 designating the fourth row of address locations in read only memory 25 to which the next lowest selected point of engine manifold vacuum, 4.5 inches of mercury, corresponds and the lower section 10000 designating the fraction 16/32 or ½. Address register 35 is now conditioned to address the first address location 65 of the fifth row of address locations of read only memory 25 to which the next highest selected point of engine manifold vacuum, 6.0 inches of mercury, corresponds. As there are 16 address locations in each row of address locations in read only memory 25, to condition address register 35 to address the first address location 65 of the fifth row of address locations, it is necessary that 64, the product of 16 address locations per row of address locations multiplied by four rows, be added to the binary word address signal for address location 1 contained in address register 35. The upper section of the binary signal representation word for 5.25 inches of mercury engine manifold vacuum contained in accumulator register 36, binary word 00100 designating the numeral four, is multiplied by the quantity 16 in arithmetic logic unit 40, which may be any binary multiplier circuit, and the product 64, binary word 00010–00000, of this multiplication operation is added to the binary word address signal, binary word 00000–00001 designating the numeral one, contained in address register 35 in binary adder 41 which may be any conventional binary adder circuit. The sum 65, binary word 00010–00001, of this addition operation is loaded into address register 35 as a binary word address signal for read only memory 25. The contents of interface memory register 21, which contains the binary signal representation word for 2300 RPM engine speed, is scaled and loaded into accumulator register 36. The value of 2300 RPM engine speed is between the values of respective selected points of engine speed 2200 and 2400 RPM, corresponding to the ninth and tenth columns of address locations of read only memory 25, and exceeds the next lowest point by one-half the difference between the selected points. Therefore, the value of 2300 RPM engine speed is coded by decoder and scaler circuit 20 as the binary signal representation word 01001–10000, the upper section 01001 designating the ninth column of address locations in read only memory 25 to which the next lowest selected point 2200 RPM engine speed corresponds and the lower section 10000 designating the fraction 16/32 or ½. Address register 35 is next conditioned to address the tenth address location 74 of the fifth row of address locations of read only memory 25 which is in the column of address locations to which the next highest selected point 2400 RPM engine speed corresponds. The upper section of the binary signal representation word for 2300 RPM engine speed contained in accumulator register 36, binary word 01001 designating the numeral nine, is added in binary adder 41 to the binary word address signal, binary word 00010–00001 designating the numeral 65, contained in address register 35; the lower section of the binary signal representation word contained in accumulator register 36, binary word 10000 representing the numeral 16, is loaded into constant multiplier register 37 and the sum 74, binary word 00010–01010, of the addition operation is loaded into address register 35. The binary signal representation word stored at address location 74 of read only memory 25 is retrieved and loaded into accumulator register 36. During this operation, the binary word contents of address register 35 reduces by one to the numeral 73, binary word 00010–01001. The binary signal representation word stored at address location 73 of read only memory 25 is retrieved and loaded into interim register 38. During this operation, the binary word contents of address register 35 reduces by one to the numeral 72, binary word 00010–01000. The interpolation equation $[(A-X) K/32 = X + 0.5]$, where "A" is the contents of accumulator register 36, "X" is the contents of interim register 38 and "K" is the contents of constant multiplier register 37, is now solved by arithmetic logic unit 40. Referring to FIG. 5, the binary signal representation words stored in address locations 73 and 74 of the read only memory 25 represent ignition spark timing angles of 29° and 31° advance, respectively. Substituting the proper numerical values in the above set forth interpolation equation, $[(31°-29°) \times 16/32 + 29° + 0.5] = 30°$ ignition spark advance, any fractional portion being disregarded. The binary signal representation word for 30° advance ignition spark timing angle, binary word 11110, is loaded into a scratch pad memory register 51. The binary word address signal contained in address register 35, binary word 00010–01000 representing the numeral 72 is reduced by 14 in arithmetic logic unit 40 to 58, binary word 00001–11010, and is then reloaded into address register 35 as the latest binary word address signal for address location 58 of read only memory 25. The binary word address signal contained in address register 35 is reduced by 14 to provide the address location 58 of read only memory 25 which is the address location in the fourth row and tenth column of address locations to which 4.5 inches of mercury engine manifold vacuum and 2400 RPM engine speed correspond, respectively. The binary signal representation word stored at address location 58 of read only memory 25 is retrieved and loaded into accumulator register 36. During this operation, the binary word contents of address register 35 reduces by one to the numeral 57, binary word 00001–11001. The binary signal representation word stored at address location 57 of read only memory 25 is retrieved and loaded into interim register 38. During this operation, the binary word contents of address register 35 reduces by one to the numeral 56, binary word 00001–11000. The interpolation equation hereinabove set forth is solved by arithmetic logic unit 40. Referring to FIG. 5, the binary signal representation words stored in address location 57 and 58 of read only memory 25 represent ignition spark timing angles of 25° and 27° advance, respectively. Substituting the proper numerical values in this equation, [ (27°–25°) 16/32 + 25° + 0.5 ] = 26° ignition spark advance, any fractional portion being disregarded. The binary signal representation word for 26° advance ignition spark timing angle, binary word 11010, is loaded into another scratch pad memory register 52. The lower section of the binary signal representation word for 5.25 inches of mercury engine manifold vacuum, binary word 10000, is retrieved from interface register 22 and is scaled and loaded into constant multiplier register 37; the binary signal representation word for 30° ignition spark advance, binary word 11110, stored in scratch pad memory register 51 is loaded into accumulator register 36 and the binary signal representation word for 26° ignition spark advance, binary word 11010, stored in scratch pad memory register 52 is loaded into interim register 38. The interpolation equation hereinabove set forth is now solved by arithmetic logic unit 40. Substituting the proper numerical values in this equation, [ (30°–26°) 16/32 + 26° + 0.05 ] = 28° ignition spark advance, any fractional portion being disregarded. Therefore, the ignition spark timing angle for 5.25 inches of mercury engine manifold vacuum at 2300 RPM engine speed is 28° advance. The binary signal representation word for 28° advance, binary word 11100, is loaded into scratch pad memory register 53.

During the calculation of the ignition spark timing angle just described, the values retrieved from and loaded into the memory registers and from read only memory 25 are properly so directed by program decode and steering logic 9 in a manner well known in the digital computer art.

Referring to FIG. 3, ignition spark vacuum advance in degrees is plotted against engine manifold vacuum in inches of mercury with selected points 1.5 inches of mercury, 3.0 inches of mercury, 4.5 inches of mercury and 6.0 inches of mercury requiring 8°, 16°, 24° and 32°, respectively, of ignition spark vacuum advance. The binary signal representation word for 8°, binary word 00000–01000, is stored in address location 226 of read only memory 25, the binary signal representation word for 16°, binary word 00000–10000, is stored in address location 227, the binary signal representation word for 24°, binary word 00000–11000, is stored in address location 228 and the binary signal representation word for 32°, binary word 00001–00000, is stored in address location 229. Therefore, the selected points within the range of values of engine manifold vacuum, 1.5 inches of mercury, 3.0 inches of mercury, 4.5 inches of mercury and 6.0 inches of mercury, correspond, respectively, to address locations 226, 227, 228, and 229 of read only memory 25. With engine manifold vacuum less than 1.5 inches of mercury and greater than 6.0 inches of mercury, vacuum advance will be the same as for 1.5 inches of mercury and 6.0 inches of mercury, respectively.

The binary word address signal for address location 225, binary word 00111–00001, of read only memory 25 is retrieved from read only memory program store 8 and loaded into address register 35 and the contents of interface register 22, which contains the binary signal representation word for 5.25 inches of mercury engine manifold vacuum, binary word 00100–10000, is scaled and loaded into accumulator register 36. The value of 5.25 inches of mercury engine manifold vacuum is between the values of respective selected points of engine manifold vacuum 4.5 inches and 6.0 inches of mercury engine manifold vacuum of FIG. 3, corresponding to the fourth and fifth address locations 228 and 229 in the row of address locations of read only memory 25 beginning with address location 225 as shown in FIG. 5, and exceeds the next lowest selected point by one-half the difference between the selected points. Therefore, the upper section of the binary signal representation word, binary word 00100–10000, for the value of 5.25 inches of mercury engine manifold vacuum, as coded by analog to digital converter and scaler 30, designates the fourth address location after the first address location in the row of address locations of read only memory 25 beginning with address location 225 and the lower section 10000 designates the fraction 16/32 or ½. As the next selected point of engine manifold vacuum of FIG. 3 greater than 5.25 inches of mercury is 6.0 inches of mercury, address register 35 is next conditioned to address the fifth address location 229, to which 6.0 inches of mercury corresponds, in the row of address locations of read only memory 25 beginning with address location 225. The upper section of the binary signal representation word for 5.25 inches of mercury engine manifold vacuum contained in accumulator register 36, binary word 00100 designating the numeral four, is added in binary adder 41 to the binary word address signal for address location 225 contained in address register 35, binary word 00111–00001; the lower section of the binary signal representation word for 5.25 inches of mercury engine manifold vacuum contained in accumulator register 36, binary word 10000 representing the numeral 16, is loaded into constant multiplier register 37 and the sum 229, binary word 00111–00101, of the addition operation is loaded into address register 35. The binary signal representation word for 32° ignition spark advance, binary word 00001–00000, stored at address location 229 of read only memory 25 is retrieved and loaded into accumulator register 36. During this operation, the binary word contents of address register 35 reduces by one to the numeral 228, binary word 00111–00100. The binary signal representation word for 24° ignition spark advance, binary word 00000–11000, stored at address location 228 of read only memory 25 is loaded into interim register 38. The interpolation equation [ $(A-X) K/32 + X +[0.5]$ ] hereinabove explained is now solved by arithmetic logic unit 40. Substituting the proper numerical values in the above set forth interpolation equation, [ (32°–24°) × 16/32 + 24° + 0.5 ] = 28° ignition spark advance, any fractional portion being disregarded. The binary signal representation word for 28° advance ignition spark timing angle, binary word 11100, is loaded into scratch pad memory register 54.

Referring to FIG. 4, the percentage of full scale ignition spark vacuum advance of FIG. 3 by which the binary signal representation words for ignition spark timing angles as retrieved from read only memory 25 are varied in accordance with engine manifold vacuum and actual atmospheric pressure is plotted against actual atmospheric pressure in inches of mercury with selected points 19 inches of mercury, 22 inches of mercury, 24 inches of mercury, 26 inches of mercury, 27 inches of mercury, 28 inches of mercury, 29 inches of mercury, and 30 inches of mercury requiring 100, 58, 35, 18, 10, 6, 2 and 0percent, respectively. The binary signal representation word for 0percent, binary word 00000-00000, is stored in address location 237 of read only memory 25, the binary signal representation word for 2percent, binary word 00000-00010, is stored in address location 236, binary signal representation word for 6percent, binary word 00000-00110, is stored in address location 235, the binary signal representation word for 10percent, binary word 00000-01010, is stored in address location 234, the binary signal representation word for 18percent, binary word 00000-10010, is stored in address location 233, the binary signal representation word for 35percent, binary word 00001-00011, is stored in address location 232 and the binary signal representation word for 58%, binary word 00001-11010, is stored in address location 231 and the binary signal representation word for 100percent, binary word 00011-00100, is stored in address location 230. Therefore, the selected points within the range of values of atmospheric pressure, 19 inches of mercury, 22 inches of mercury, 24 inches of mercury, 26 inches of mercury, 27 inches of mercury, 28 inches of mercury, 29 inches of mercury and 30 inches of mercury, correspond, respectively, to address locations 230, 231, 232, 233, 234, 235, 236, and 237 of read only memory 25. read The binary word address signal for address location 225, binary word 00111-00001, of read only memory 25 is retrieved from read only memory program store 8 and loaded into address register 35 and the contents of interface register 23, which contains the binary word representation of 26.5 inches of mercury atmospheric pressure, is scaled and loaded into accumulator register 36. The value of 26.5 inches of mercury atmospheric pressure is between the values of respective selected points of atmospheric pressure 26 inches and 27 inches of mercury of FIG. 4, corresponding to the ninth and tenth address locations 233 and 234 in the row of address locations of red only memory 25 beginning with address location 225 as shown in FIG. 5, and exceeds the next lowest point by one-half the difference between the selected points. Therefore, the value of 26.5 inches of mercury atmospheric pressure is coded by analog to digital converter and scaler 30 as the binary word 01001-10000. The upper section of the binary signal representation word, binary word 01001-10000, for the value of 26.5 inches of mercury atmospheric pressure, as coded by analog to digital converter and scaler 30, designates the ninth address location after the first address location in the row of address locations of read only memory 25 beginning with address location 225 and the lower section 10000 designates the fraction 16/32 or ½. As the next selected point of atmospheric pressure of FIG. 4 greater than 26 inches of mercury is 27 inches of mercury, address register 35 is next conditioned to address the tenth address location 234, to which 27 inches of mercury atmospheric pressure corresponds, in the row of address locations of read only memory 25 beginning with address location 225. The upper section of the binary word representation of 26.5 inches of mercury atmospheric pressure contained in accumulator register 36, binary word 01001 designated the numeral nine, is added in binary adder 41 to the binary word address signal for address location 225 contained in address register 35, binary word 00111-00001; the lower section of the binary signal representation word for 26.5 inches of mercury atmospheric pressure contained in accumulator register 36, binary word 10000 representing the numeral 16, is loaded into constant multiplier register 37 and the sum 234, binary word 00111-01010, of the addition operation is loaded into address register 35. The binary signal representation word for 10percent, binary word 00000-01010, stored at address location 234 of read only memory 25 is retrieved and loaded into accumulator register 36. During this operation, the binary word contents of address register 35 reduces by one to the numeral 233, binary word 00111-01001. The binary signal representation word for 18percent, binary word 00000-10010, stored at address location 233 of read only memory 25 is loaded into interim register 38. The interpolation equation $[(A-X\ K/32\ +\ X\ +\ 0.5]$ hereinabove explained is now solved by arithmetic logic unit 40. Substituting the proper numerical values in the above set forth interpolation equation, $[(10-18\text{percent}) \times 16/32 + 18\text{ percent} + 0.5] = 14\text{percent}$, any fractional portion being disregarded. The binary signal representation word for 14percent, binary word 01110, is loaded into scratch pad memory register 55. The binary signal representation word for 28° advance ignition spark timing angle contained in scratch pad memory register 54 is multiplied in arithmetic logic unit 40 by the binary word representation of 14percent contained in scratch pad memory register 55. The product, 3°, is added in binary adder 41 to the binary signal representation word for 28° ignition spark timing angle advance stored in scratch pad memory register 53. The sum of this addition operation is 31° ignition spark timing angle advance which is the ignition spark timing angle produced by read only memory 25 based upon the instantaneous value of both 2300 engine RPM engine speed at 5.25 inches of mercury manifold vacuum and varied in accordance with 5.25 inches of mercury manifold vacuum and an actual atmospheric pressure of 26.5 inches of mercury. The binary signal representation of 31° ignition spark timing angle advance, binary word 00000-11111, is the binary word output signal of the ignition spark timing control system of this invention. This binary signal representation output word is taken from the output circuitry of binary adder 41 and stored in ignition spark timing angle register 42 until the next engine cylinder is to be fired.

In FIG. 2 of the drawing, dashed lines indicate the loci of the amount of ignition spark advance the calculated ignition spark timing angle advance value retrieved from read only memory 25 is varied in accordance with engine manifold vacuum at an actual atmospheric pressure of 26.5 inches of mercury. From this FIGURE, it is apparent they by so varying the calculated ignition spark timing angle advance tends to tilt the three dimensional surface generated by read only memory 25 in a clockwise direction about the engine speed axis. The table of FIG. 3 indicates that, as actual atmospheric pressure decreases, the greater is the amount that the calculated ignition spark timing angle advance is varied. That is the calculated ignition spark timing angle advance is varied in accordance with engine manifold vacuum and actual atmospheric pressure by an amount substantially inversely proportional to actual atmospheric pressure.

In a practical application of the ignition spark timing angle control circuit of this invention, ignition signal logic circuitry, which is not a part of this invention, processes the engine crankshaft reference signal pulses induced in pickup coil 18, the engine crankshaft position signal pulses induced in pickup coil 16 and the ten bit binary word binary signal representation of ignition spark timing angle stored in ignition spark timining angle register 42 and produces an outer signal which initiates ignition system dwell time when it goes positive and initiates an ignition sparking potential when it goes negative or to ground potential.

While a preferred embodiment of the present invention has been shown and described, it will be obvious to those skilled in the art that various modifications and substitutions may be made without departing from the spirit of the invention which is to be limited only within the scope of the appended claims.

What is claimed is:

1. An ignition spark timing control system for use with a spark ignition internal combustion engine and a sequence control arrangement comprising: a read only memory pre-programmed to produce an output binary signal representation of predetermined ignition spark timing angle based upon the instantaneous value of both of two selected engine operating parameters at each of a plurality of respective selected points within the range of values in response to respective input address signals whereby over the range of values of the two selected engine operating parameters the read only memory generates a three-dimensional surface of ignition spark timing angles based upon the two selected engine parameter values; means for producing input address signals for said read only memory in response to binary signal representations of instantaneous values of said selected two engine operating parameters; means for applying said input address signals to said read only memory whereby the binary signal representation of an ignition spark timing angle is produced by said read only memory in response to each of said input address signals; and means effective to vary the binary signal representations of the ignition spark timing angles as retrieved from said read only memory in accordance with engine manifold vacuum in substantial inverse proportion to atmospheric pressure whereby said three-dimensional surface generated by said read only memory is tilted about a selected engine parameter value as an axis in an amount substantially inversely proportional to actual atmospheric pressure.

2. An ignition spark timing control system for use with a spark ignition internal combustion engine and a sequence control arrangement comprising: a read only memory pre-programmed to produce an output binary signal representation of a predetermined ignition spark timing angle based upon the instantaneous value of both engine manifold vacuum and speed at each of a plurality of respective selected points within the range of values in response to respective input address signals whereby over the range of values of engine manifold vacuum and speed the read only memory generates ignition spark timing angles based upon engine manifold vacuum and speed in the form of a three-dimensional surface having engine speed, engine manifold vacuum and timing angles as respective axes; means for producing input address signals for said read only memory in response to binary signal representations of instantaneous values of engine manifold vacuum and speed; means for applying said input address signals to said read only memory whereby the binary signal representation of an ignition spark timing angle is produced by said read only memory in response to each of said input address signals; means for producing an output binary signal representation of a value derived from engine intake manifold vacuum values and atmospheric pressure values, said output binary signal representation value varying inversely with atmospheric pressure; and means for producing an output binary signal representation of the sum of said binary signal representation of an ignition spark timing angle retrieved from each read only memory and said output binary signal representation of said last named means whereby said three-dimensional surface generated by said read only memory is tilted about the engine speed axis thereof in an amount substantially inversely proportional to atmospheric pressure.

3. An ignition spark timing control system for use with a spark ignition internal combustion engine and a sequence control arrangement comprising: a read only memory pre-programmed to produce an output binary signal representation of a predetermined ignition spark timing angle based upon the instantaneous value of both of two selected engine operating parameters at each of a plurality of respective selected points within the range of values in response to respective input address signals whereby over the range of values of the two selected engine operating parameters the read only memory generates a three-dimensional surface of ignition spark timing angles based upon the two selected engine parameters values; means for producing input address signals for said read only memory in response to binary signal representations of instantaneous values of said selected two engine operating parameters; means for applying said input address signals to said read only memory whereby the binary signal representation of an ignition spark timing angle is produced by said read only memory in response to each of said input address signals; first means responsive to engine manifold vacuum for producing a binary signal representation of an ignition spark vacuum advance timing angle for each of various values of engine manifold vacuum; second means responsive to atmospheric pressure for producing a binary signal representation of a percentage of said binary signal representation of ignition spark advance angle produced by said first means as determined by atmospheric pressure, means responsive to said first and second means for producing the binary signal representation of the product of the said binary signal representations produced by said first and second means; and means responsive to said last means for adding the binary signal representation produced by said last means to the binary signal representation of ignition spark advance angle retrieved from said read only memory for producing a binary signal representation of total ignition spark advance angle.

4. An ignition spark timing control system for use with a spark ignition internal combustion engine and a sequence control arrangement comprising: a read only memory pre-programmed to produce an output binary signal representation of a predetermined ignition spark timing angle based upon the instantaneous value of both of two selected engine operating parameters at each of a plurality of respective selected points within the range of values in response to respect input address signals whereby over the range of values of the two selected engine operating parameters the read only memory generates a three-dimensional surface of ignition spark timing angles based upon the two selected engine parameters values; means for producing input address signals for said read only memory in response to binary signal representations of instantaneous values of said selected two engine operating parameters; means for applying said input address signals to said read only memory whereby the binary signal representation of an ignition spark timing angle is produced by said read only memory in response to each of said input address signals; first means responsive to engine manifold vacuum for producing a binary signal representation of an ignition spark vacuum advance timing angle for each value of engine manifold vacuum; second means responsive to atmospheric pressure for producing an output binary signal representation of a percent value which varies inversely from a maximum to a minimum value with increasing values of atmospheric pressure; means responsive to said binary signal representations produced by said first and second means for producing the binary signal representation of the product thereof; and means effective to produce the sum of said binary signal representation of an ignition spark timing angle retrieved from said read only memory and the binary signal representation of the product of the binary signal representations of said first and second means.

5. An ignition spark timing control system for use with a spark ignition combustion engine and a sequence control arrangement comprising: a read only memory pre-programmed to produce an output binary signal representation of a predetermined ignition spark timing angle based upon the instantaneous value of both of two selected engine operating parameters at each of a plurality of respective selected points within the range of values in response to respective input address signals whereby over the range of values of the two selected engine operating parameters the read only memory generates a three-dimensional surface of ignition spark timing angles based upon the two selected engine parameters values; means for producing input address signals for said read only memory in response to binary signal representations of instantaneous values of said selected two engine operating parameters; means for applying said input address signals to said read only memory whereby the binary signal representation of an ignition spark timing angle is produced by said read only memory in response to each of said input address signals; first means responsive to engine manifold vacuum for producing an output binary signal representation of an ignition spark vacuum advance timing angle for each value of engine manifold vacuum, second means responsive to atmospheric pressure for producing an output binary signal representation of a percent value which varies inversely from a maximum value at approximately two-thirds normal atmospheric pressure to zero at normal atmospheric pressure; means for producing an output binary signal representation of the product of the output binary signal representation of said first means multiplied by the output binary signal representation of said second means; and means for producing an output binary signal representation of the sum of said binary signal representation of an ignition spark timing angle retrieved from said read only memory and the output binary signal representation of said last means.

* * * * *

UNITED STATES PATENT OFFICE
CERTIFICATE OF CORRECTION

Patent No. 4,009,699     Dated March 1, 1977

Inventor(s) Lewis R. Hetzler et al.

It is certified that error appears in the above-identified patent and that said Letters Patent are hereby corrected as shown below:

```
Col. 1, lines 7 and 8, "singal" should read -- signal --;
        line 30, "is" should read -- as --.
Col. 2, line 32, "angle" should read -- angles --;
        line 64, "drive" should read -- drove --.
Col. 4, line 8, "6" should read -- 16 --.
Col. 5, line 63, "is" second occurrence should read -- in --.
Col. 7, line 66, after "lowest" insert -- selected --.
Col. 10, line 53, after the plus sign (+) (second occurrence)
                  delete the bracket ( [ ).
Col. 11, line 30, after the period (.) delete "read ";
         line 43, "red" should be -- read --.
Col. 12, line 39, before "RPM", delete "engine";
         line 57, "they" should read -- that --.
Col. 13, line 8, "timining" should read -- timing --;
         line 9, "outer" should read -- output --.
Col. 14, line 12, before "read" delete "each" and substitute
                  -- said --;
         line 65, "respect" should read -- respective --.
Col. 15, line 28, after "ignition" insert -- internal --.
```

Signed and Sealed this second Day of August 1977

[SEAL]

Attest:

RUTH C. MASON
*Attesting Officer*

C. MARSHALL DANN
*Commissioner of Patents and Trademarks*